(12) United States Patent
Tsai

(10) Patent No.: US 7,677,166 B2
(45) Date of Patent: Mar. 16, 2010

(54) ADJUSTABLE VACUUM FOOD STORAGE CONTAINER

(76) Inventor: Mei-Hua Tsai, 4F., No. 14, Lane 379, ChungMei Street, Taichung City (TW)

( * ) Notice: Subject to any disclaimer, the term of this patent is extended or adjusted under 35 U.S.C. 154(b) by 1031 days.

(21) Appl. No.: 11/378,385

(22) Filed: Mar. 20, 2006

(65) Prior Publication Data
US 2007/0227617 A1 Oct. 4, 2007

(51) Int. Cl.
*B65D 81/20* (2006.01)
(52) U.S. Cl. ............... 99/472; 141/65; 141/83; 141/94; 206/524.8; 220/231
(58) Field of Classification Search ........... 206/543, 206/544, 524.8; 141/65, 8, 83, 94, 95; 220/231; 215/262; 99/472
See application file for complete search history.

(56) References Cited
U.S. PATENT DOCUMENTS
1,347,194 A * 7/1920 Washington ............... 99/468

| | | | | |
|---|---|---|---|---|
| 3,943,987 A * | 3/1976 | Rossi | ............. | 206/524.8 |
| 5,570,628 A * | 11/1996 | Kiener et al. | ............. | 99/472 |
| 5,946,919 A * | 9/1999 | McKinney et al. | ............. | 62/3.7 |
| 5,964,255 A * | 10/1999 | Schmidt | ............. | 141/65 |
| 2004/0099332 A1* | 5/2004 | Kieck | ............. | 141/65 |
| 2005/0145292 A1* | 7/2005 | De Costa | ............. | 141/65 |
| 2007/0193915 A1* | 8/2007 | Shao | ............. | 206/524.8 |

* cited by examiner

*Primary Examiner*—Gregory L Huson
*Assistant Examiner*—Jason K Niesz
(74) *Attorney, Agent, or Firm*—Rabin & Berdo, P.C.

(57) ABSTRACT

The invention is to provide an adjustable vacuum food storage container, comprising of a base, a socket mounted on the base, and a cover covering the socket; a vacuum controller, a pressure detective means, an out connector power means, a spare battery set, and a power switch are disposed on the base, and an exhaust valve are further added on upper cover; the pressure detective connected to the socket for auto-detecting the accommodation between the socket and the upper cover, and the vacuum controller combined to the pressure detective means for keep it at vacuum state at any moment.

6 Claims, 6 Drawing Sheets

ADJUSTABLE VACUUM FOOD STORAGE CONTAINER

FIELD OF THE INVENTION

The invention relates to a food storage container, and more particularly to an adjustable vacuum food storage container that detects, adjusts and maintains the vacuum.

BACKGROUND OF THE INVENTION

Vacuum sealed storage devices have become readily available in recently years as people have begun preserving leftovers rather than treating them as waste. Conventional storage devices in accordance with the prior art that maintain a vacuum are prolific. However, detecting whether the vacuum has changed is difficult. Even though the conventional devices can seal the container and create a vacuum, some air may remain inside the storage device, and people therefore may not know the vacuum at another moment. Conventional storage devices cannot automatically detect and adjust the vacuum. So the food in the conventional storage devices may not be well-protected.

To overcome the disadvantage of the conventional food container, the present invention provides an improved and adjustable vacuum food storage container to overcome the issue mentioned above.

SUMMARY

An objective of the invention is to provide a food storage container with vacuum detecting and adjusting capabilities that can automatically detect pressure inside the container and simultaneously adjust the vacuum.

The invention is an adjustable vacuum food storage container and comprises a base, a housing and a cover. The base comprises a vacuum controller, a pressure detector, an external power socket, a spare battery set and a power switch mounted on the base. The cover is transparent, has an exhaust valve and is connected to the pressure detector so pressure between the housing and the cover can be continuously monitored. The vacuum controller is combined with the pressure detector to maintain the vacuum.

DETAILED DESCRIPTION OF A PREFERRED EMBODIMENT

Figure 1:
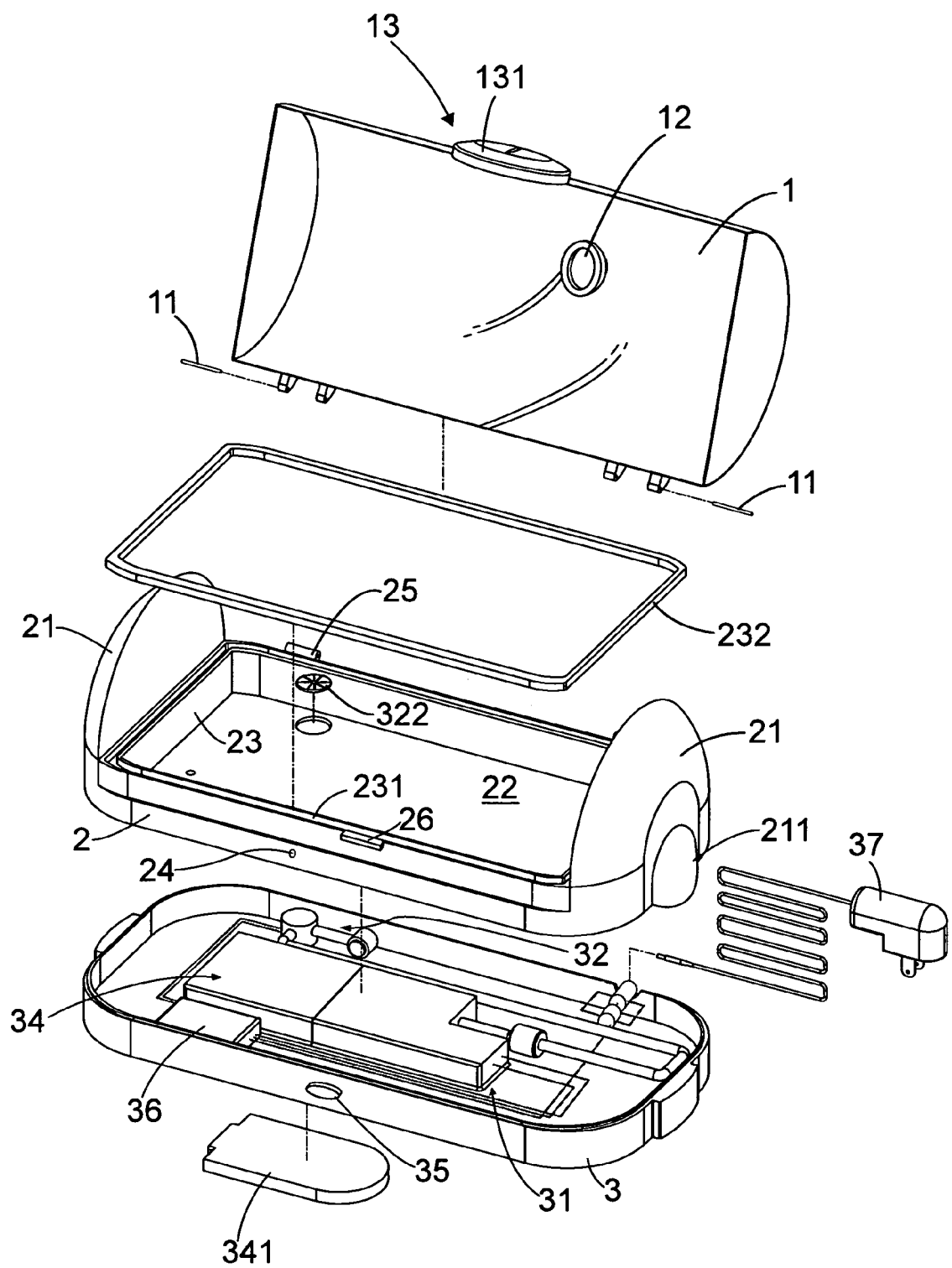
FIG. 1 is an exploded perspective view of a food storage container in accordance with the present invention.
Figure 2:
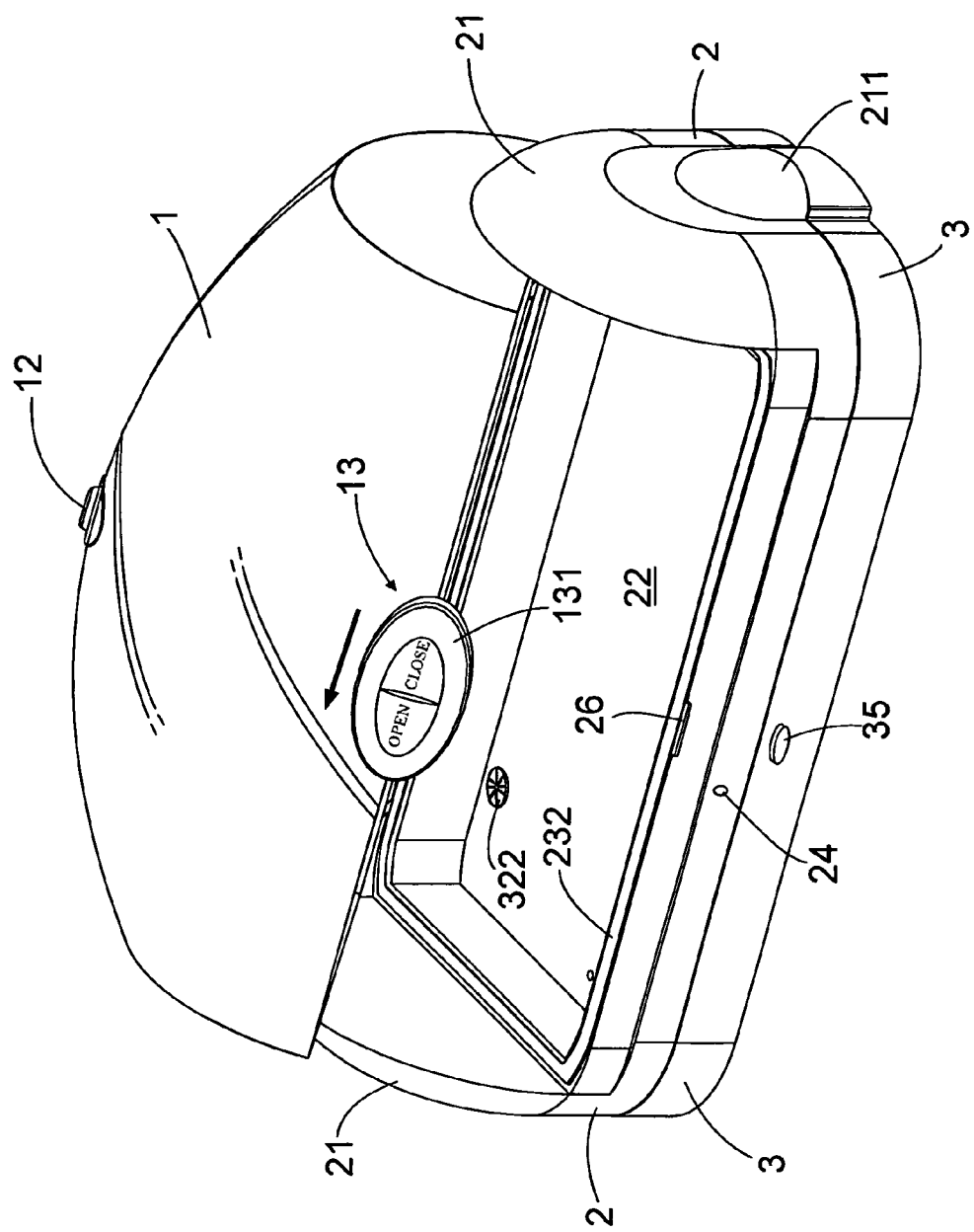
FIG. 2 is a perspective view of the food storage container in FIG. 1.

With reference to FIGS. 1 and 2, a food storage container in accordance with the present invention comprises a base 3, a U-Shaped-housing 2 and a cover 1.

Figure 4:
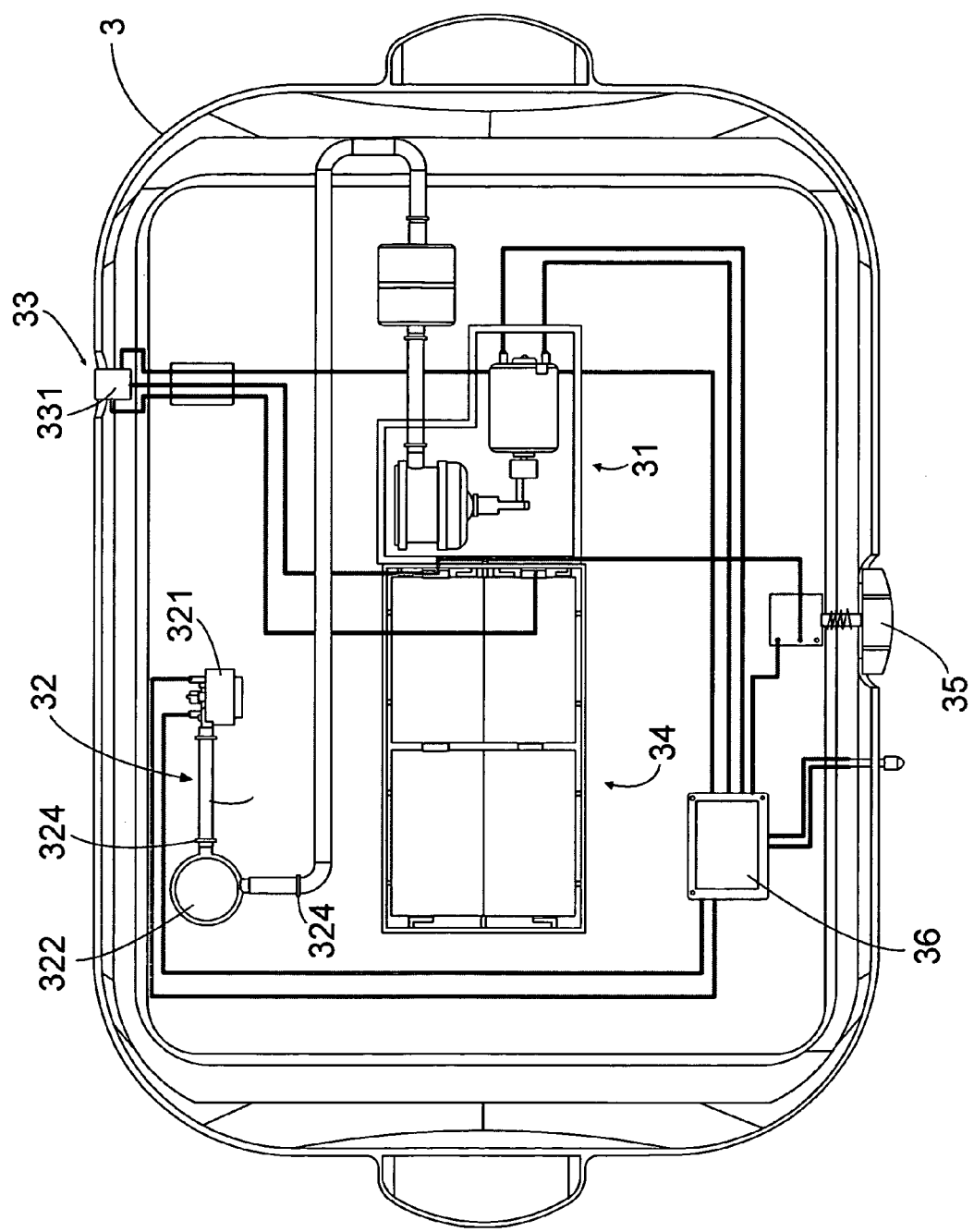
FIG. 4 is a top internal view of the food storage container in FIG. 1.

With further reference to FIG. 4, the base 3 is a mounting tray, has an outer edge, a protruding lip and an open top and comprises a vacuum controller 31, a pressure detector 32, an external power socket 33, a spare battery set 34, a power switch 35 and an integrated circuit board 36. The protruding lip is formed on and protrudes up from the outer edge.

Figure 5:
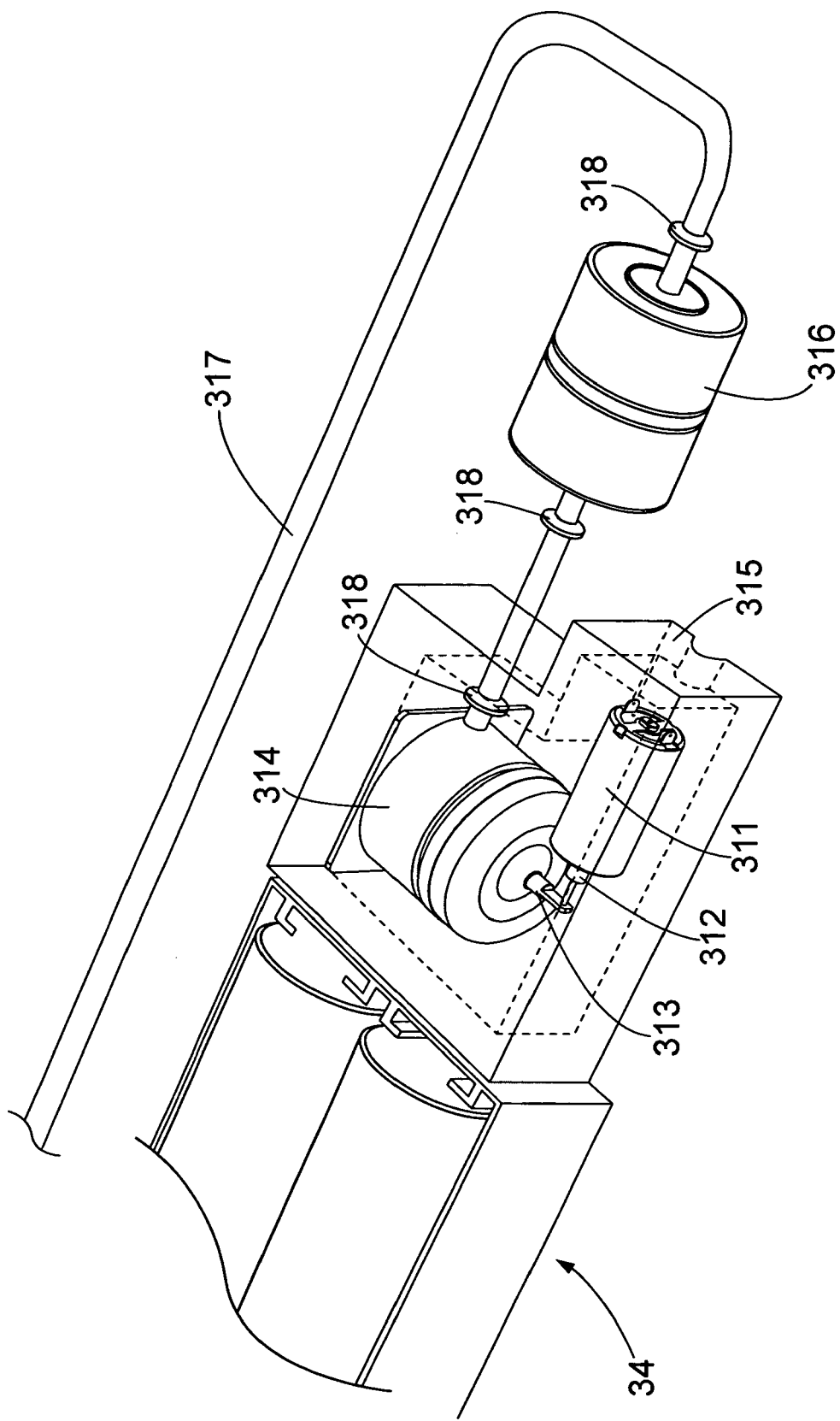
FIG. 5 is an enlarged perspective view of a vacuum controller in the food storage container in FIG. 1.

With further reference to FIG. 5, the vacuum controller 31 comprises a motor 311, an eccentric fitting 312, a rocker arm 313, a vacuum pump 314, a protective cover 315, a back pressure valve 316, pipes 317, and clamping rings 318. The eccentric fitting 312 has two ends with one end connecting to the motor 311. The rocker arm 313 connects to the other end of the eccentric fitting 312. The vacuum pump 314 is mounted on the rocker arm 313. The protective cover 315 covers the motor 311, the eccentric fitting 312, the rocker arm 313 and the vacuum pump 314, protects the vacuum pump 314 and the motor 311, decreases noise when the food storage container is operating and circulates air from the vacuum pump 314 to cool the motor 311. The back pressure valve 316 is connected to the vacuum pump 314 by the pipe 317. The clamping rings 318 are mounted on and connect the pipes 317 to the vacuum pump 314 and the back pressure valve 316. So the motor 311, the eccentric fitting 312, the rocker arm 313, and the vacuum pump 314 remove air.

The pressure detector 32 is connected to the back pressure valve 316 and comprises a pressure sensor 321, a filter 322, pipes 323 and clamping rings 324. The filter 322 connects to the pressure sensor 321 on one side and connects to the back pressure valve 316 on the other side. One pipe 323 connects the pressure sensor 321 to the filter 322. Another pipe 323 connects the filter 322 to a pipe 317 from the back pressure valve 316. The clamping rings 324 connect the pipes 323 and the filter 322 or the pipes 323 and the pressure sensor 321. The filter 322 keeps food residues from being sucked into the back pressure valve 316 and the vacuum pump 314. The pressure sensor 321 can automatically detect changes in pressure and actuate the motor 311 through the power switch 35 to switch the vacuum pump 314 on or off until the pressure returns to a pre-determined value. Pressure can be detected by the pressure sensor from 0 to 60 Kpa (negative pressure).

The external power socket 33 comprises a DC contact 331, a magnetic loop (not shown) and a rectifier 37. The DC contact 331 is hoop by the magnetic loop to avoid electrostatic, and the rectifier 37 is inserted into the DC contact 331 on one side and is connected to external AC power on the other side.

Figure 3:
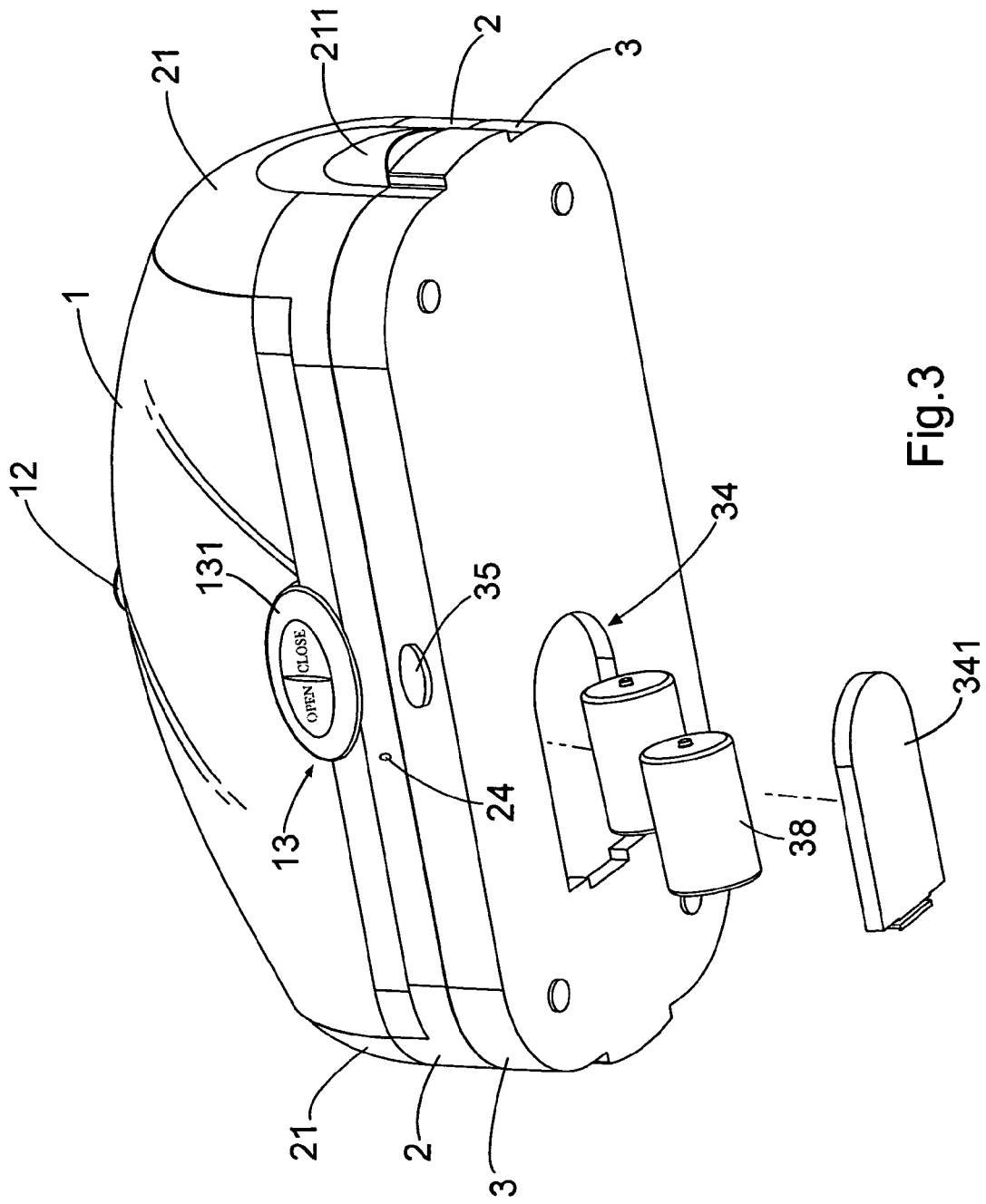
FIG. 3 is a partially exploded bottom perspective view of the food storage container in FIG. 1.

With further reference to FIG. 3, the spare battery set 34 may have several batteries 38 to supply power independently without any external power.

The U-shaped housing 2 holds food, is mounted on the base 3 comprises an external shell 21, a food tray 22, an operation indicator 24, at least one hinge 25 and a latch protrusion 26.

The external shell 21 is U-shaped, has a front surface, a rear surface and two ends.

The food tray 22 is mounted in the external shell 21 between the two ends and has a front, a rear and two end walls, a gasket groove 231 and a gasket 232. The walls are connected, and each wall has a top edge. The gasket groove 231 is formed in top edges of the walls. The gasket 232 is mounted in the gasket groove 231.

The operation indicator 24 is mounted through the front surface of the external shell 21.

The at least one hinge 25 is formed on and protrudes from the rear surface of the external shell 21.

The latch protrusion 26 is formed on and protrudes from the front surface of the external shell 21.

Figure 6:
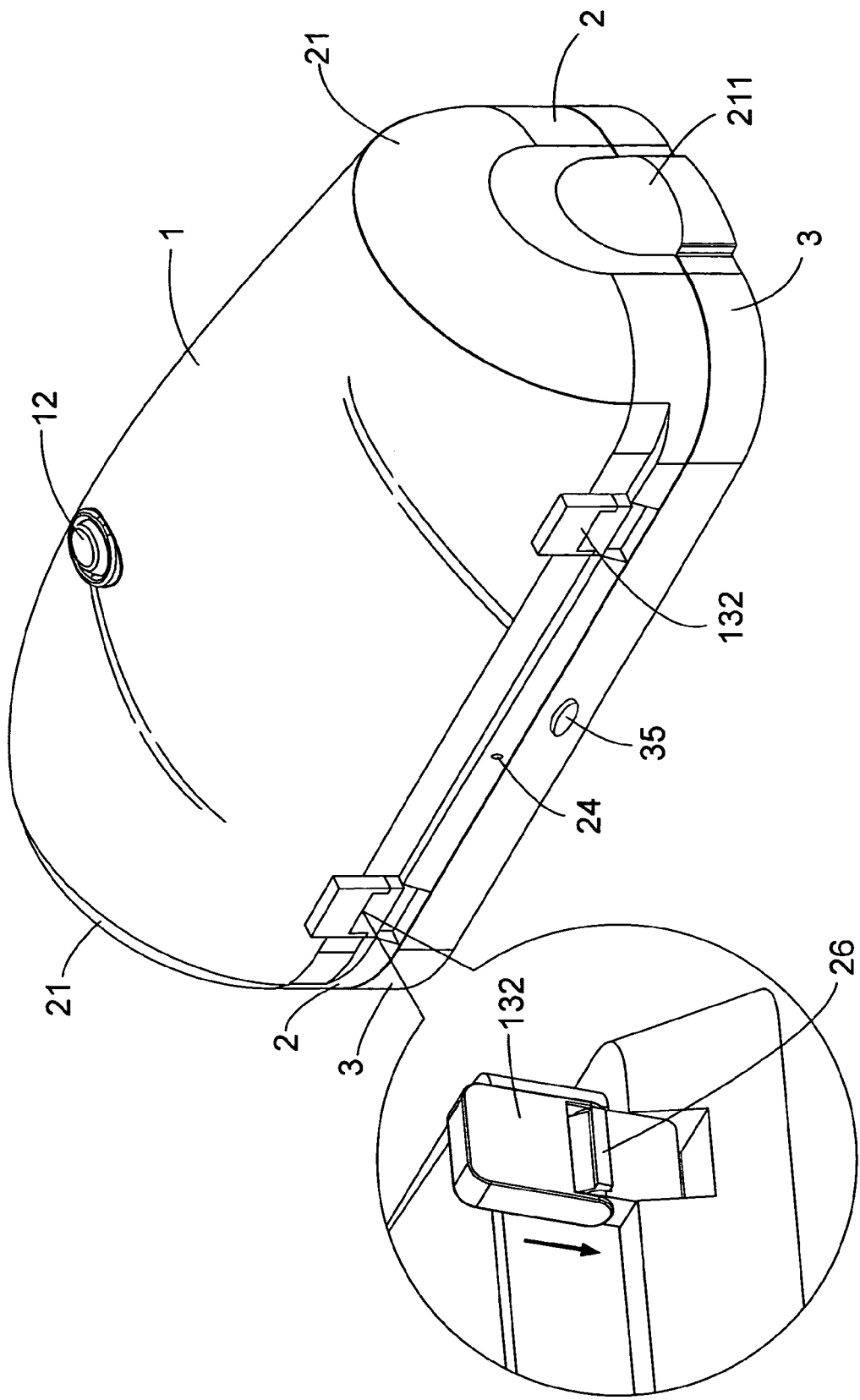
FIG. 6 is a perspective view of the food storage container in FIG. 1 with an enlarged perspective view of a latch on the food storage container.

With further reference to FIG. 6, the cover 1 is mounted pivotally on the U-shaped housing 2, forms an airtight seal against the gasket 232 and comprises at least one pintle 11, an exhaust valve 12 and a latch 13.

The at least one pintle 11 is mounted through the corresponding hinge to pivotally attach the cover 1 to the U-Shaped housing 2.

The exhaust valve 12 is mounted through the cover 1 and serves as a manual or automatic vacuum breaker.

The latch 13 is mounted on the cover 1, engages the U-shaped housing to hold the cover securely against the gasket 232 and may be a fixed latch 131 or a pivoting latch 132.

A person knowledgeable in the art will understand that various changes could be made without departing from the broad spirit and scope of the invention. The above-described embodiment is intended to illustrate the present invention, not to limit the scope of the present invention.

What is claimed is:

1. An adjustable vacuum food storage container, comprising:
    a base being a mounting tray, having an outer edge, a protruding lip being formed on and protruding up from the outer edge, the base including:
        a vacuum controller that includes:
            a motor;
            an eccentric fitting having two ends with one end connecting to the motor;
            a rocker arm connecting to the other end of the eccentric fitting;
            a vacuum pump mounted on the rocker arm;
            a protective cover covering the motor, the eccentric fitting, the rocker arm and the vacuum pump, thereby protecting the vacuum pump and the motor, and decreasing noise when the food storage container is operating and circulating air from the vacuum pump to cool the motor;
            first pipes;
            a back pressure valve connected to the vacuum pump by one of the first pipes; and
            first clamping rings mounted on and connecting the first pipes to the vacuum pump and the back pressure valve;
        a pressure sensor automatically detecting chances in a pressure thereof and actuating the motor to switch the vacuum pump on or off until the pressure returns to a pre-determined value;
        a filter connecting to the pressure sensor on one side and connecting to the back pressure valve on the other side;
        second pipes connecting the pressure sensor to the filter and connecting the filter to one of the first pipes from the back pressure valve; and
        second clamping rings connecting the second pipes to the filter, and connecting the second pipes to the pressure sensor;
        an external power socket that includes:
            a magnetic loop;
            a DC contact hooped by the magnetic loop for avoiding electrostatic; and
            a rectifier inserted into the DC contact on one side and being connected to an external AC power on the other side;
        a spare battery set;
        a power switch; and
        an integrated circuit board;
    a U-shaped housing mounted on the base, including:
        an external shell of U-shape, having a front surface, a rear surface and two ends, a food tray being mounted in the external shell between the two ends and having a front, a rear and two end walls, a gasket groove being formed in top edges of the walls, and a gasket being mounted in the gasket groove;
        an operation indicator;
        at least one hinge formed on and protruding from the rear surface of the external shell; and
        a latch protrusion formed on and protruding from the front surface of the external shell; and
    a cover mounted pivotally on the U-shaped housing, thereby forming an airtight seal against the gasket, the cover including:
        at least one pintle mounted through a corresponding hinge to pivotally attach the cover to the U-shaped housing;
        an exhaust valve mounted through the cover and serving as a manual or automatic vacuum breaker; and
        a latch mounted on the cover, engaging the U-shaped housing to hold the cover securely against the gasket.

2. The adjustable vacuum food storage container of claim 1, wherein a pressure of an accommodation between the cover and the U-shaped housing is kept at about 35 Kpa.

3. The adjustable vacuum food storage container of claim 1, wherein a suction force of the vacuum pump ranges from 0 to 50 Kpa.

4. The adjustable vacuum food storage container of claim 1, wherein the pressure detected by the pressure sensor ranges from 0 to 60 Kpa (negative pressure).

5. The adjustable vacuum food storage container of claim 1, wherein the spare battery set includes several batteries to supply power independently of the external AC power.

6. The adjustable vacuum food storage container of claim 1, wherein the latch of the cover is a fixed latch or a pivoting latch.

* * * * *